(12) United States Patent
Sato (10) Patent No.: US 7,209,735 B2
(45) Date of Patent: Apr. 24, 2007

(54) MOBILE COMMUNICATION APPARATUS (75) Inventor: Hiroaki Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

(21) Appl. No.: 10/086,867

(22) Filed: Mar. 4, 2002

(65) Prior Publication Data

US 2002/0123333 A1    Sep. 5, 2002

(30) Foreign Application Priority Data

Mar. 5, 2001    (JP)    ............................ P2001-060697

(51) Int. Cl.
*H04M 3/42*    (2006.01)

(52) U.S. Cl. ............ 455/415; 379/115.01; 379/142.01; 379/188; 455/410; 455/414.1; 455/417; 455/432.1; 455/432.2; 455/432.3

(58) Field of Classification Search ................ 379/115.01–115.03, 142.01–142.08, 188–200; 455/410, 414.1, 415, 417
See application file for complete search history.

(56) References Cited

U.S. PATENT DOCUMENTS

| | | | |
|---|---|---|---|
| 5,815,808 A * | 9/1998 | Valentine ................. 455/422.1 |
| 6,317,594 B1 * | 11/2001 | Gossman et al. ........ 455/414.1 |
| 6,334,054 B1 * | 12/2001 | Link et al. ................... 455/413 |
| 6,453,167 B1 * | 9/2002 | Michaels et al. ........... 455/466 |
| 6,456,706 B1 * | 9/2002 | Blood et al. ................. 379/188 |
| 6,615,036 B1 * | 9/2003 | Haas et al. .................. 455/413 |
| 6,684,072 B1 * | 1/2004 | Anvekar et al. ......... 455/432.1 |
| 6,714,799 B1 * | 3/2004 | Park et al. ................... 455/558 |
| 6,771,953 B1 * | 8/2004 | Chow et al. ................. 455/417 |
| 7,054,658 B1 * | 5/2006 | Lobo ....................... 455/553.1 |

* cited by examiner

*Primary Examiner*—Duc M. Nguyen
*Assistant Examiner*—Matthew Genack
(74) *Attorney, Agent, or Firm*—Banner & Witcoff, Ltd.

(57) ABSTRACT

A method and apparatus are disclosed for automatically handling an incoming call by a mobile communication apparatus when the call is determined to be an international roam call. When an incoming international roam call is detected, the mobile communication apparatus can allow the call to ring as normal, send the call to a local or network voice mail service, or play a prerecorded message to the caller informing the caller that the phone is not accepting international roam calls. The decision can be based on the apparatus's home and registered networks' mobile country code (MCC) and mobile network code (MNC) information, on the caller ID of the calling party, and on the date and/or time of the incoming international roam call. The parameters on which the decisions are made may be set by the user of the apparatus or preset by a manufacturer or dealer.

18 Claims, 8 Drawing Sheets

Fig.1

| MCC in EF_IMSI | MNC in EF_IMSI | broadcasted MCC | broadcasted MNC | Operation when an international roam call is received |
|---|---|---|---|---|
| Japan | A network | Korea | B network | displaying "internation roming" message |
| Japan | C network | Taiwan | D network | setting voice mail on the apparatus |
| Germany | E network | Hongkong | F network | setting voice mail service in the network |

*Fig.2*

| MCC in EF_IMSI | Broadcasted MCC | Operation when an international roam call is received |
|---|---|---|
| Japan | Korea | displaying "international roming" message |
| Japan | Taiwan | setting voice mail on the apparatus |
| Germany | Hongkong | setting voice mail in the network |

*Fig.3*

| MCC in EF_IMSI | Broadcasted MCC | caller ID | Operation when an international roam call is received |
|---|---|---|---|
| Japan | Korea | | setting voice mail in the network |
| Japan | Taiwan | | setting voice mail in the network |
| Japan | Korea | 090-123-4567 090-234-5678 | ringing of a incoming call |
| Japan | Taiwan | 090-345-6789 | setting voice mail on the apparatus |

*Fig.4*

| MCC in EF_IMSI | Broadcasted MCC | Time | Operation when an international roam call is received |
|---|---|---|---|
| Japan | Korea | | setting voice mail on the apparatus |
| Japan | Taiwan | | setting voice mail on the apparatus |
| Japan | Korea | 8:00-17:00 | ringing of a incoming call |
| Japan | Taiwan | Satarday/Sunday | ringing of a incoming call |

MOBILE COMMUNICATION APPARATUS

RELATED APPLICATION INFORMATION

This application claims priority under 35 U.S.C. § 119 to Japanese patent application P2001-60697, filed on Mar. 5, 2001, whose contents are expressly incorporated herein by reference.

FIELD OF THE INVENTION

The present invention relates generally to mobile telecommunications networks. More specifically, the invention relates to a mobile communication apparatus being capable of having an Integrated Circuit (IC) card for communicating and relates to a method for handling incoming calls in the mobile communication apparatus.

DESCRIPTION OF THE RELATED ART

A Subscriber Identification Module (SIM) card is necessary to use a Global System for Mobile communication (GSM) mobile telephone, such as are used in Europe. The SIM card is a storing unit. It can comprise a plurality of Integrated Circuits (IC), and stores information that is needed to communicate with a mobile communication network. The SIM card includes information such as an authentication algorithm required for communication, an identification number, etc. The identification number is used for identifying a subscriber as an authorized user in the mobile network. A GSM cellular phone communicates with the network based on information contained in the SIM card.

A third generation (3G) mobile phone system, referred to as International Mobile Telecommunications 2000 (IMT2000), is being standardized all over the world. In IMT2000, a Universal Subscriber Identity Module (USIM) card is necessary for each mobile device to communicate with each mobile communication network. The USIM card has basically the same functionality as SIM cards in GSM networks, in that the USIM card stores data such as an authentication algorithm required for communication and an identification number for identifying a subscriber as an authorized user in a 3G mobile communication network system. The USIM card also can store a telephone directory for storing telephone numbers that may be referenced by the mobile communication apparatus in which it is located.

Figure 6:
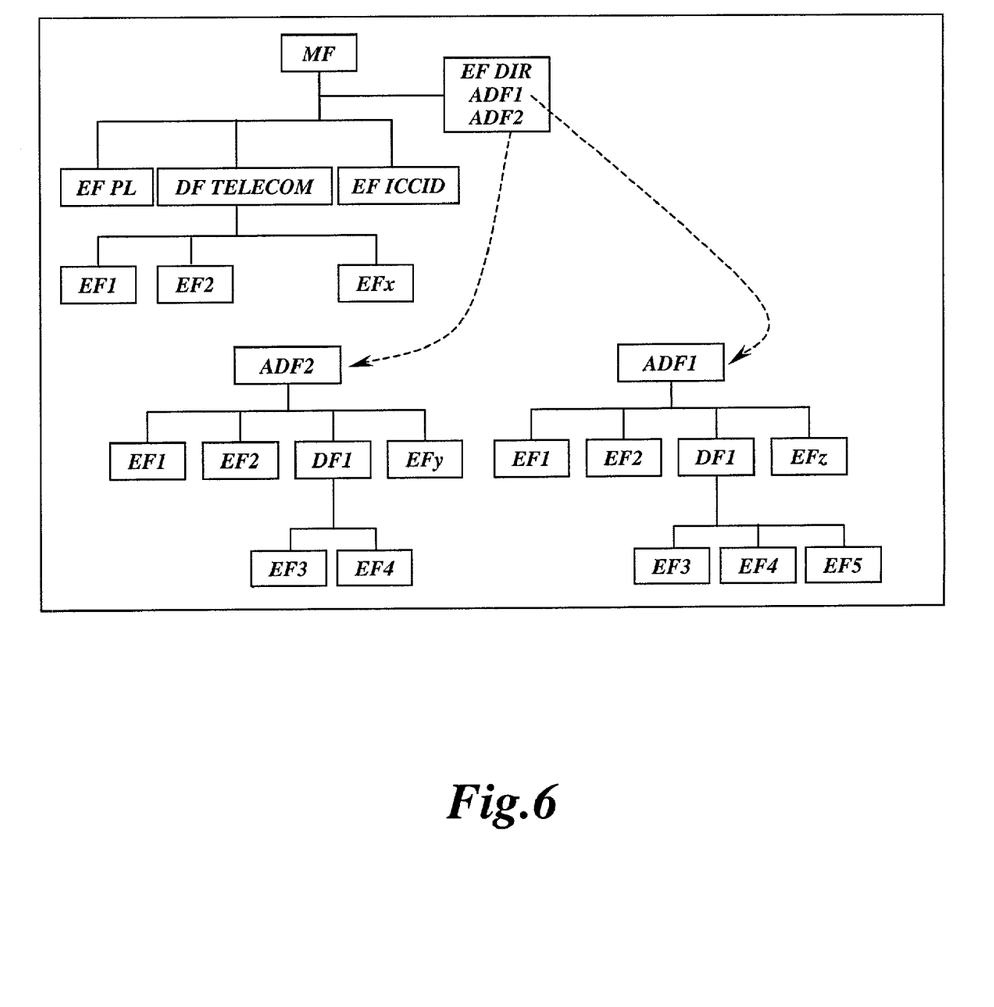
FIG. 6 illustrates a configuration of files in a USIM card, according to an embodiment of the invention

As shown in FIG. 6, each USIM card has four Elementary Files (EF1, EF2, EF3 and EF4), each of which stores data for establishing a link with a mobile network.

Each of EF1, EF2, EF3 and EF4 includes an Elementary File International Mobile Subscriber Identity (EF_IMSI).

Figure 7:
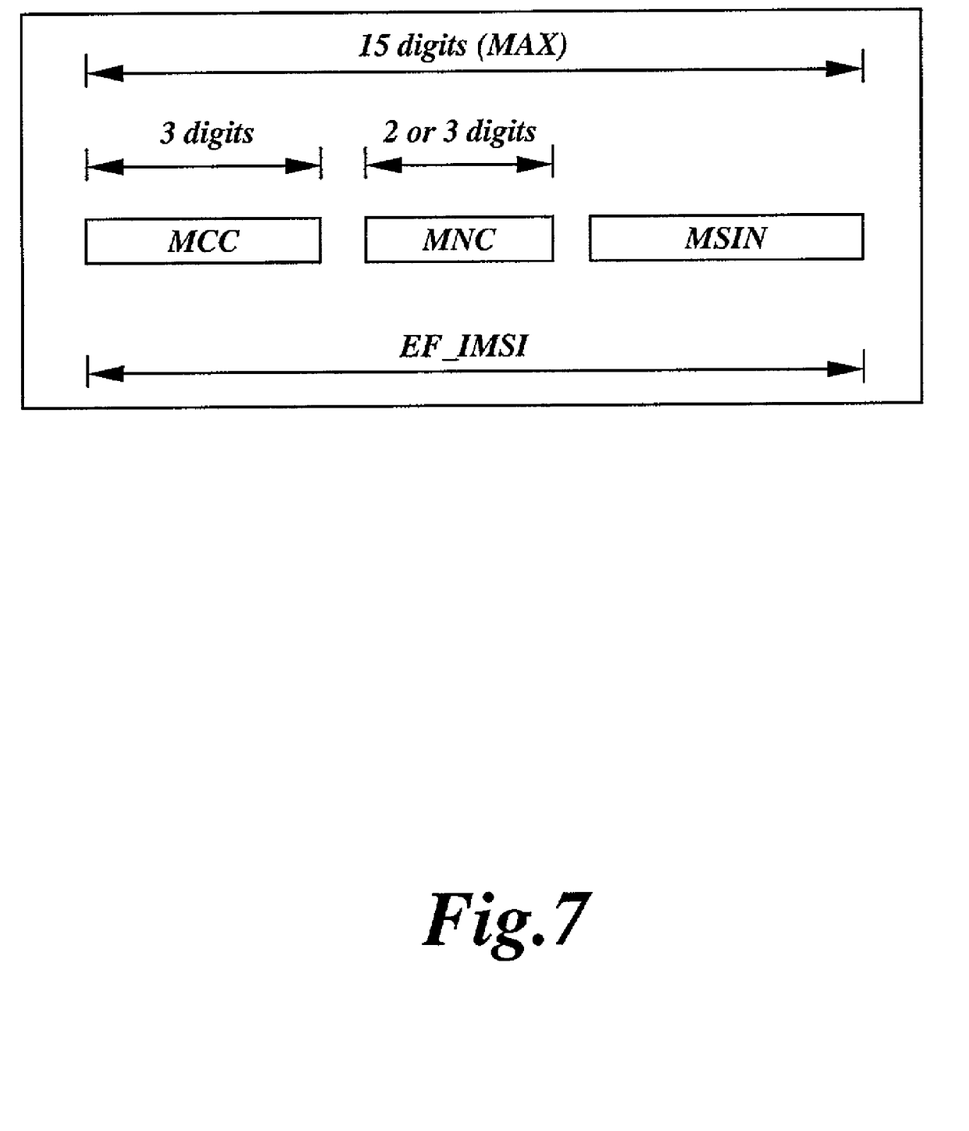
FIG. 7 illustrates a configuration of EF_IMSI according to an embodiment of the invention.

As shown in FIG. 7, the EF_IMSI comprises the following three elements: Mobile Country Code (MCC), Mobile Network Code (MNC) and Mobile Subscriber Identification Number (MSIN). The MCC has three digits and indicates a country code of a mobile communication network to which the subscriber belongs (i.e., the subscriber's home country). The MNC has two or three digits and indicates a network code of a mobile communication network to which the subscriber belongs (i.e., the subscriber's home network). The MSIN indicates a unique number (e.g., the telephone number) identifying the mobile device in the mobile communication network to which the subscriber belongs.

Calls made to or from a network other than the subscriber's home network, but within the same country, are referred to as domestic roaming calls. Calls made to or from a country other than the subscriber's home country are referred to as international roaming calls. Subscribers typically must pay a surcharge for domestic and international roaming calls. When a subscriber is roaming (domestic or international), the subscriber's phone typically registers with the local network in which it is presently located. In this manner, the subscriber may continue to receive calls without any change noticeable to other subscribers (i.e., the subscriber still receives calls using the same telephone number). As a result, callers may not realize that the subscriber they are calling is actually in a network other than her home network, or a country other than her home country.

Figure 8:
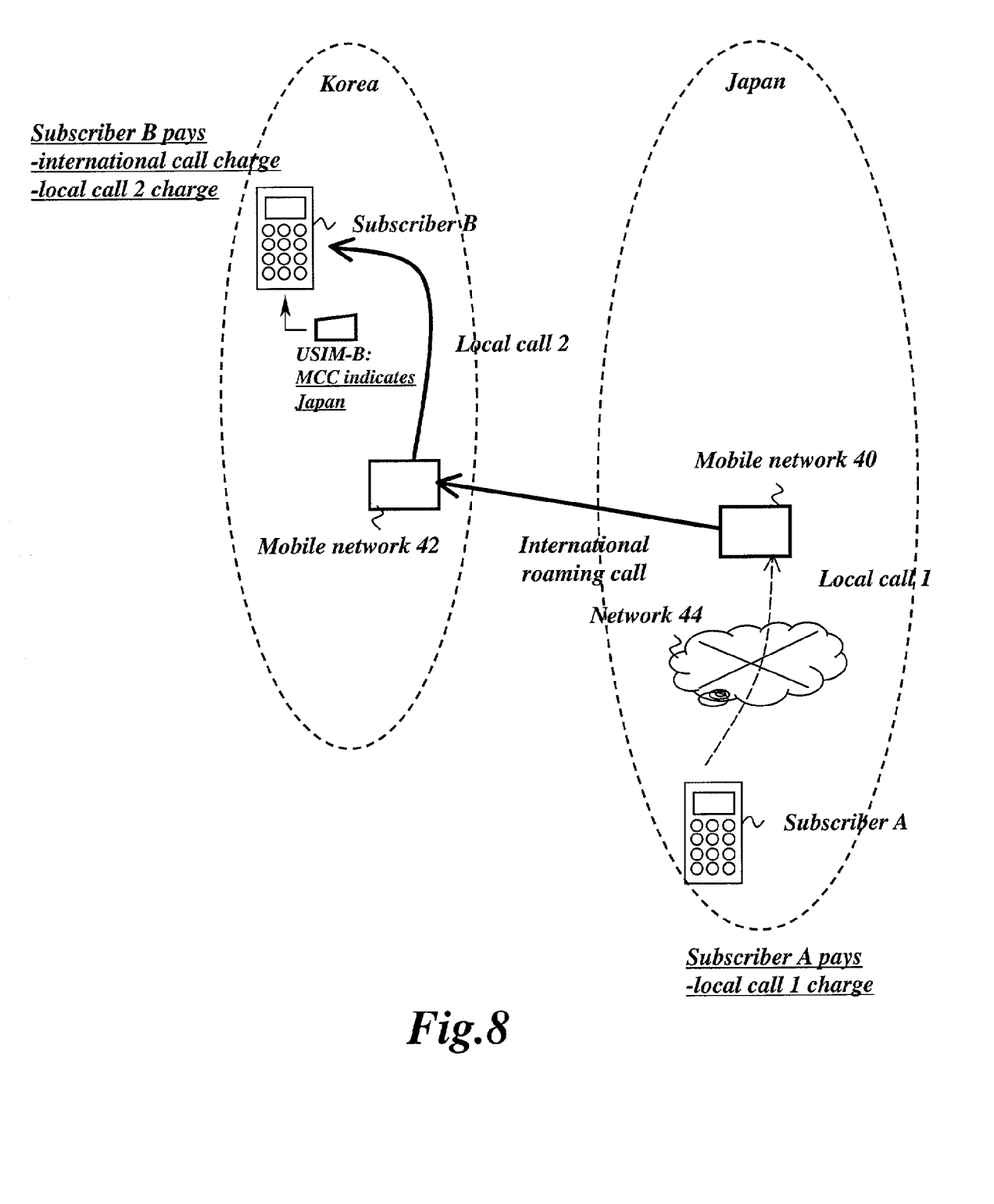
FIG. 8 illustrates data flow during an international roaming call according to an embodiment of the invention.

As shown in FIG. 8, for example, a subscriber B has a USIM card whose MCC is Japanese country code "81" and the MNC indicates a mobile network 40 as the network to which the subscriber B belongs and MSIN indicates "090.0123.4567" as a telephone number.

When subscriber A calls subscriber B, subscriber A must input the telephone number "81+090.0123.4567." At first, subscriber A accesses mobile network 40 over a network 44 in Japan (local call 1). Mobile network 40 recognizes that subscriber B is located in Korea and that Korea is a roaming country because subscriber B registered its location in Korea to mobile network 40. After recognizing that subscriber B is in Korea, mobile network 40 accesses mobile network 42 in Korea to call subscriber B (international roaming call). The accessed mobile network 42 calls subscriber B (local call 2).

In presently known IMT2000 systems, international roaming call charges are paid by the called party. For the reasons stated above, the subscriber typically will continue to receive calls using the same telephone number. The subscriber may not want to answer each telephone call (or any telephone calls) while roaming; because each answered telephone call results in additional roaming charges (i.e., international roaming call and local call 2). However, there is presently no method or apparatus that can automatically block or otherwise redirect incoming international roaming calls. Thus, the subscriber must answer the phone each time it rings, and incur roaming charges, before she can decide whether she should have taken the call. This often results in the subscriber paying roaming charges for calls that she otherwise would not have taken, for example, inadvertent calls, wrong numbers dialed, or unnecessary or frivolous calls.

In some known systems, the subscriber has the benefit of a caller ID that is displayed on the mobile communication apparatus, and can decide whether to take a call based on the caller ID information. However, the mobile communication apparatus will still ring for every call. The subscriber may turn off the sound on the mobile phone, but then she may miss an important call that she actually wants to receive.

Thus, it would be advancement in the art to provide a mobile communication apparatus that, upon detecting an incoming international roam call, selectively automatically ignores or accepts the call based on predefined criteria, without requiring a user to make a decision regarding each call. It would be a further advancement in the art to make such a decision based on various criteria set by a user, including caller ID and date/time information.

SUMMARY OF THE INVENTION

According to the various embodiments, a mobile communication apparatus can set in advance an operation to perform when the apparatus receives an international roaming incoming call. The apparatus may determine the operation based on the information stored in an IC unit and further based on broadcasted information from the mobile network. Using this information, the mobile communication apparatus can automatically choose to ignore international roam calls, to forward them to a network voice mail service, to answer the call using a phone's local voice mail service, to play a prerecorded message informing the caller that the phone is not accepting international roam calls, or any other action appropriate to handle international roam calls. By automatically analyzing and responding to incoming international roam calls, and optionally presenting caller ID information to a user, the user is not forced to answer the phone each time it rings before learning that the call is an unwanted international roam call, thus saving unnecessary international roam fees.

In order to achieve the above object, the invention provides a mobile communication apparatus comprising: a comparing module that compares a first information stored in a storage unit with a second information received from a mobile network; a setting module that sets an operation to be performed by the apparatus when an incoming call is received based on operation decision data stored in memory, wherein the operation decision data comprises decision information based at least on the first and second information.

This invention also provides a method for handling incoming telephone calls by a mobile communications apparatus, comprising the steps of: reading a first information from a storage unit; receiving a second information from a mobile network with which the apparatus is presently communicating; and selectively handling incoming telephone calls based at least on values of the first and second information.

DETAILED DESCRIPTION OF THE PREFERRED EMBODIMENTS

Hereafter, an illustrative embodiment of the present invention will be described with reference to the drawings.

Figure 1:
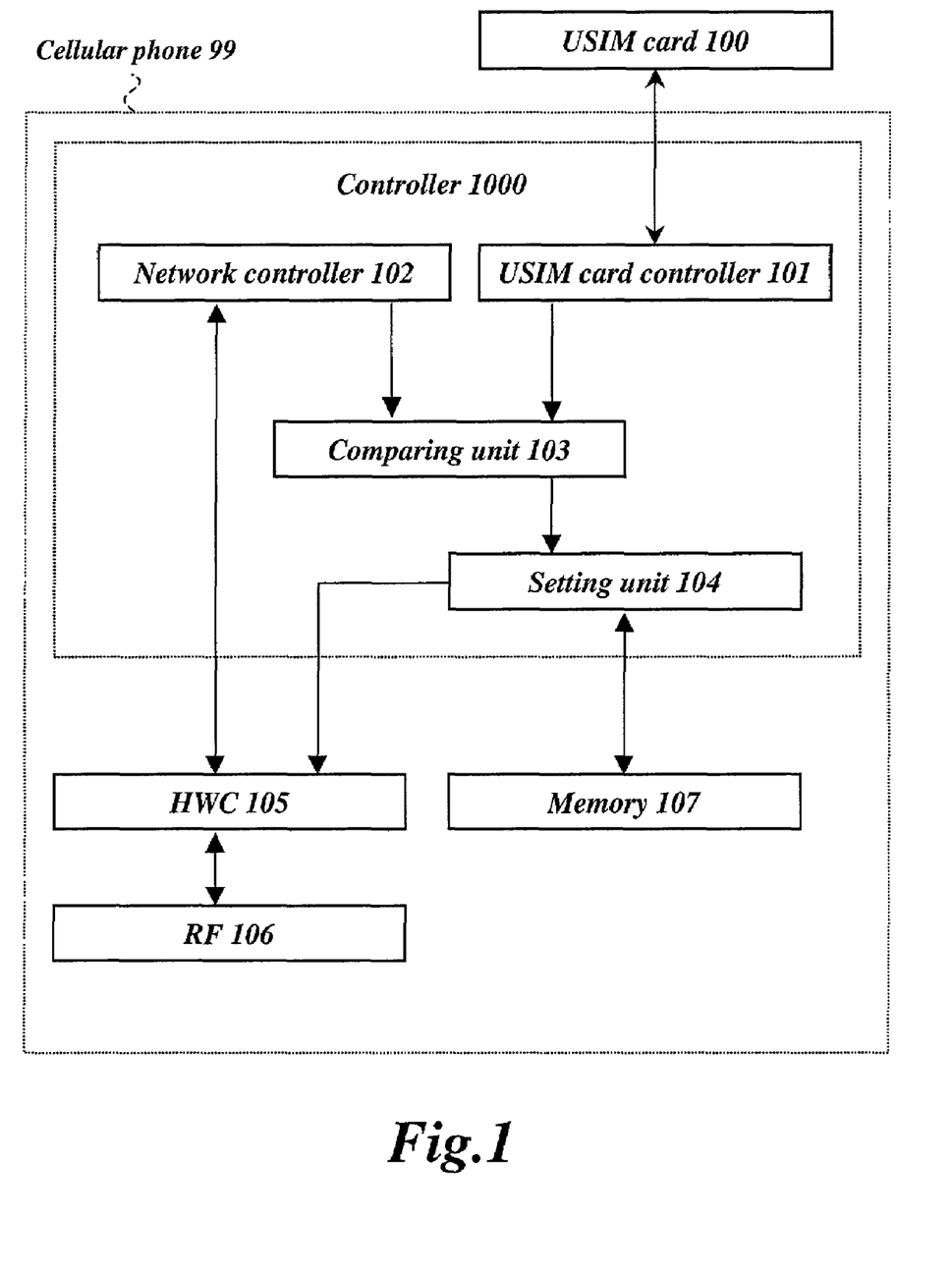
FIG. 1 illustrates a configuration of a mobile communication apparatus according to an embodiment of the present invention.

FIG. 1 illustrates a configuration of a mobile communication apparatus 99, such as a cellular or mobile telephone, according to an embodiment of the present invention. Mobile communication apparatus may alternatively be any mobile or portable device configured capabilities, such as a personal digital assistant, notebook or portable computer, and the like. In addition, any communications device with a data communications or USIM card could alternatively be used. For illustrative purposes only, a mobile communication apparatus is described with reference to a cellular phone.

Cellular phone 99 may include a controller 1000, a hardware controller (HWC) 105, a radio frequency (RF) transceiver 106 and a memory 107. Controller 1000 may comprise a USIM controller 101, a network controller 102, a comparing unit 103 and a setting unit 104. It should be appreciated by one of skill in the art that one or more of the cellular phone's components may be performed by hardware circuits, software routines stored in memory and executed by an onboard processor, or any combination of the two.

Cellular phone 99 can attach and detach USIM card 100. USIM card 100 stores data field EF_IMSI, illustrated in FIG. 7. EF_IMSI may comprise the three elements Mobile Country Code (MCC), Mobile Network Code (MNC) and Mobile Subscriber Identification Number (MSIN).

The MCC typically has three digits and indicates a home country code of the mobile network to which the subscriber belongs. The MNC typically has two or three digits and indicates a mobile network code to which the subscriber belongs. The MSIN indicates a unique number identifying the cellular phone (e.g., a telephone number) in the mobile network to which the cellular phone belongs. The UISM card controller 101 reads the elements in EF_IMSI.

A mobile network in which a cellular phone is presently registered ("registered network") broadcasts data over a specified radio channel. One piece of this broadcasted data is referred to as the master information block, and includes the registered network's MCC and MNC, which may or may not be the same as the stored MCC and MNC information in EF_IMSI.

The broadcasted MCC indicates the country in which the registered network is located. The broadcasted MNC indicates the registered network's unique identification in that country. The master information block is received by RF transceiver 106 and sent to network controller 102 through HWC 105. The network controller 102 detects the MCC and MNC information from the master information block.

The comparing unit 103 compares the MCC value stored in the USIM card 100 with the MCC value retrieved from the master information block broadcasted by the mobile network in which the cellular phone 99 is presently registered. The comparing unit 103 also compares the MNC value stored in the USIM card 100 with the MNC value retrieved from the master information block broadcasted by the mobile network in which the cellular phone 99 is presently registered.

The setting unit 104 sets an operation of the cellular phone 99 to be performed while the cellular phone 99 is roaming internationally, based on the results of the comparing unit 103 (i.e., on whether the cellular phone is presently in its home network and/or country), by looking up the correct operation in a table stored in memory 107. The table is referred to herein as the operation decision table. The operation to be performed by the cellular phone when an international roaming call is received may be stored in advance in the operation decision table by the phone's manufacturer or software designer. Alternatively, a user of the cellular phone 99 can manually determine and store the desired operation(s) in the operation decision table in memory 107.

Figure 2:
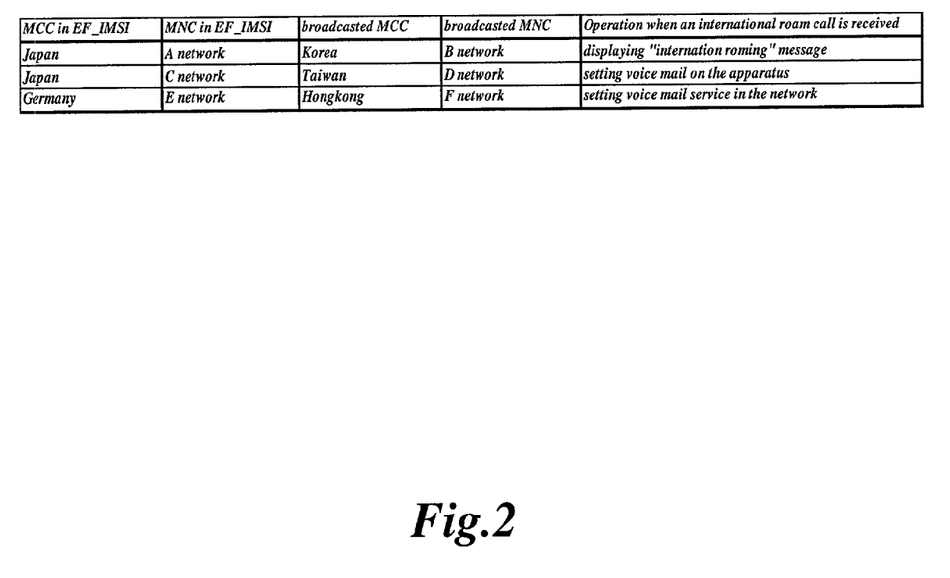
FIG. 2 illustrates data stored in a table that may be used to determine an operation to perform while internationally roaming, based on MCC and MNC information in EF_IMSI and broadcasted MCC and MNC information, according to an embodiment of the invention.

FIG. 2 illustrates an operation decision table that may be used when the setting unit 104 determines the operation based on the home network's MCC and MNC in combination with the registered network's MCC and MNC.

For example, when the MCC in EF_IMSI indicates "Japan", the MNC in EF_IMSI indicates "A network", the MCC in the broadcasted information from the registered mobile network indicates "Korea" and the MNC in the broadcasted information from the registered mobile network indicates "B network", the setting unit 104 may set the operation of the cellular phone 99 to display the message "international roaming" on the phone's display.

In this manner, by watching the display, the user of the cellular phone 99 is reminded that she is roaming internationally, and can select either to answer the incoming call (and pay for the international roaming charge) or to turn off the power source to stop the phone from receiving any further incoming calls. The set operation can include displaying the caller ID (Identification Number) of the caller so that the user of the cellular phone can make the decision whether to answer the phone on a call-by-call basis.

In another example, when the MCC in EF_IMSI indicates "Japan", the MNC in EF_IMSI indicates "C network", the MCC in the broadcasted information from the registered mobile network indicates "Taiwan" and the MNC in the broadcasted information from the registered mobile network indicates "D network", the setting unit 104 may set the operation that the cellular phone records an incoming voice. That is, in the mobile network model that supports voice mail services at both the device and network levels, setting unit 104 enables the cellular phone's voice mail service.

The set operation can also optionally include displaying a message on the display, such as "local voice mail." The message indicates to the user that the cellular phone 99 is set to record an incoming voice using the phone's voice mail service.

In a third example, when the MCC in EF_IMSI indicates "Germany", the MNC in EF_IMSI indicates "E network", the MCC in the broadcasted information from the registered mobile network indicates "Hong Kong" and the MNC in the broadcasted information from the registered mobile network indicates "F network", the setting unit 104 may set the operation of the cellular phone to automatically send all incoming international roaming calls to the home or registered network's voice mail service.

The set operation can again optionally include displaying a message on the display, such as "network voice mail." The message may indicate to the user that the cellular phone 99 is set to forward international roaming calls to a voice mail service in a mobile network.

In the above examples, the operation is determined based on the home network's MCC and MNC in combination with the registered network's MCC and MNC. However, with reference to sample data illustrated in FIG. 3, in another embodiment of the invention the operation may be determined based on the first MCC in combination with the second MCC.

Figure 3:
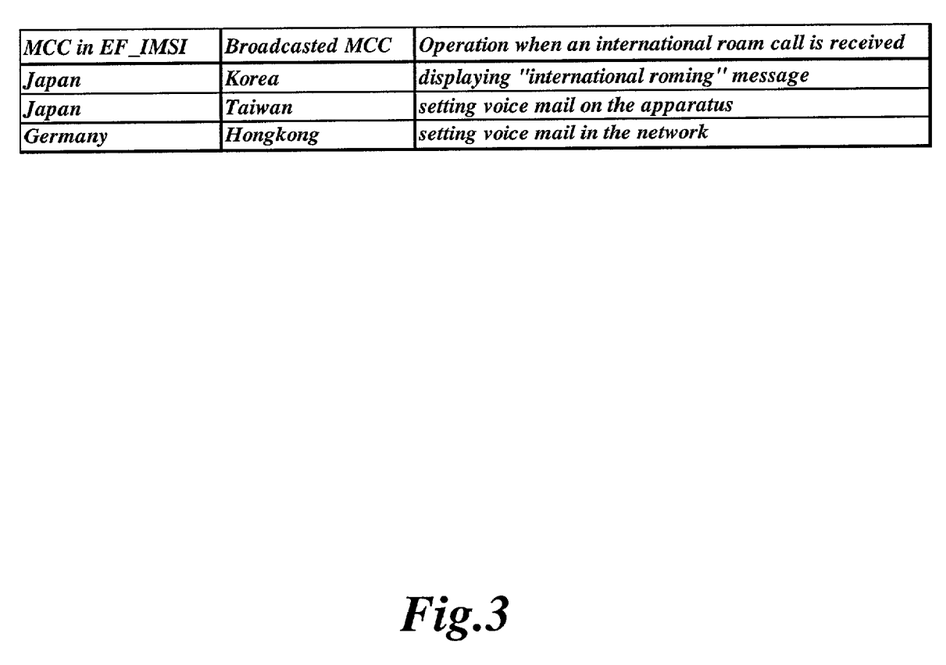
FIG. 3 illustrates data stored in a table that may be used to determine an operation to perform while internationally roaming, based on MCC information in EF_IMSI and broadcasted MCC information, according to an embodiment of the invention.

For example, when the home network's MCC in EF_IMSI indicates "Japan" and the registered network's MCC in the broadcasted information indicates "Korea", the setting unit 104 may set the operation of the cellular phone 99 to display the message "international roaming" on the phone's display. In this embodiment, MNC information is ignored.

In another example, when the MCC in EF_IMSI indicates "Germany" and the MCC in the registered network's broadcasted information indicates "Hong Kong", the setting unit 104 may set the operation of the cellular phone to automatically send international roam calls to a voice mail service in the home or registered network.

The set operation, as above, may optionally include displaying a message on the display indicating that the cellular phone is set to automatically send international roam calls to a voice mail service in the network.

Figure 4:
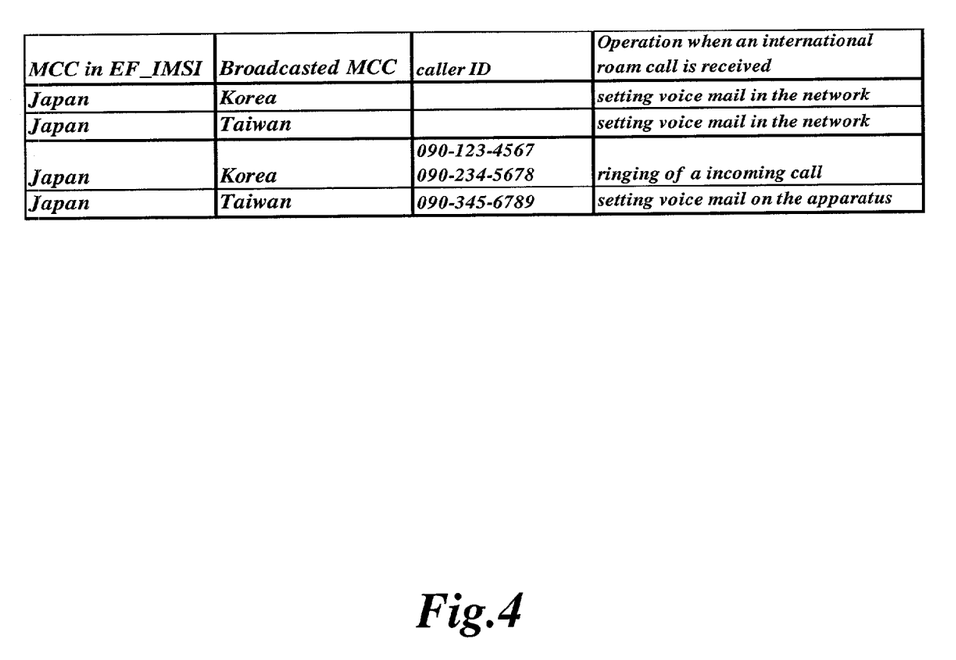
FIG. 4 illustrates data stored in a table that may be used to determine an operation to perform while internationally roaming, based on an incoming caller's ID, according to an embodiment of the invention.

In another embodiment of the invention, with reference to sample data illustrated in FIG. 4, the setting unit 104 may determine the operation based on the home network's MCC, the registered network's MCC, and a caller ID associated with a calling party.

For example, when the MCC in EF_IMSI indicates "Japan", the MCC in the registered network's broadcasted information indicates "Korea", and the caller ID indicates "090.123.4567" or "090.234.5678", the setting unit 104 may set the operation of the cellular phone 99 to ring as a normal incoming call. This operation means that the cellular phone 99 accepts the incoming call.

When the MCC in EF_IMSI indicates "Japan", the MCC in the registered network's broadcasted information indicates "Korea", and the caller ID does not indicate either "090.123.4567" or "090.234.5678", the setting unit 104 sets the operation of the cellular phone to automatically forward the call to a voice mail service in the home or registered network.

When the MCC in EF_IMSI indicates "Japan", the MCC in the registered network's broadcasted information indicates "Taiwan", and the caller ID indicates "090.345.6789", the setting unit 104 may set the cellular phone's operation to record an incoming voice using the phone's local voice mail.

When the MCC in EF_IMSI indicates "Japan", the MCC in the registered network's broadcasted information indicates "Korea", and the caller ID does not indicate "090.345.6789", the setting unit 104 may set the cellular phone's operation to forward the call to a voice mail service in the home or registered network.

Figure 5:
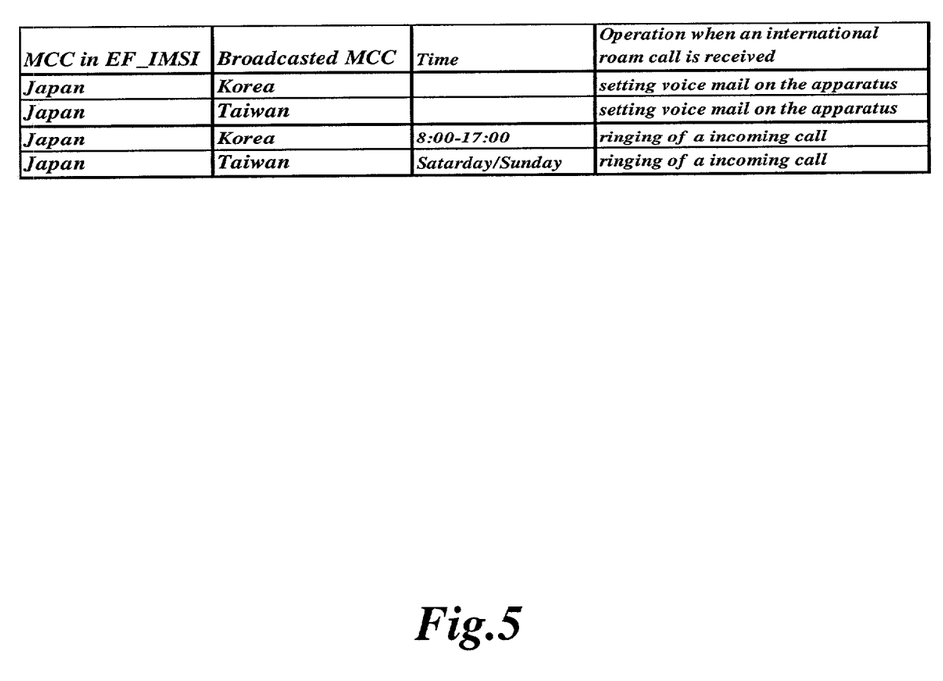
FIG. 5 illustrates data stored in a table that may be used to determine an operation to perform while internationally roaming, based on a date and/or time when a mobile apparatus receives an incoming call, according to an embodiment of the invention.

In another embodiment of the invention, with reference to sample data illustrated in FIG. 5, the operation can be based on the home network's MCC, the registered network's MCC, and the time and/or the day when the cellular phone 99 receives an incoming call. 1511 For example, when the MCC in EF_IMSI indicates "Japan", the MCC in the registered network's broadcasted information indicates "Korea" and the time when the cellular phone 99 receives an incoming call is in the range 08:00–17:00, the setting unit 104 may set the cellular phone's operation to ring as a normal incoming call.

When the MCC in EF_IMSI indicates "Japan", the MCC in the registered network's broadcasted information indicates "Korea" and the time when the cellular phone 99 receives an incoming call is not in the range 08:00–17:00, the setting unit 104 may set the phone's operation to forward the call to a voice mail service in the home or registered network.

When the MCC in EF_IMSI indicates "Japan", the MCC in the registered network's broadcasted information indicates "Taiwan" and the day when the cellular phone 99 receives an incoming call is Saturday or Sunday, the setting unit 104 may set the phone's operation to ring as a normal incoming call.

When the MCC in EF_IMSI indicates "Japan", the MCC in the registered network's broadcasted information indicates "Korea" and the day when the cellular phone 99 receives an incoming call is not Saturday or Sunday, the setting unit 104 may set the phone's operation to forward the call to a voice mail service in the home or registered network.

The variables on which the operational decision are based may be set by the user of the cellular phone, or may be preset at a factory or according to some predefined criteria. In addition, the values of the variables may be set by the user or may also be predetermined. That is, the user can decide whether the international roaming operation decision should be based on MCC information, MNC information, date, time, caller ID, or any combination thereof, and also which operation should be performed when the user-defined conditions are met.

Other operations may also be used in addition to those operations described above. For instance, the operation also can be that the cellular phone 99 does not receive an incoming call. That is, the cellular phone does not ring to alert the user to answer the phone, so that the user will not be forced to pay international roaming charges.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A mobile communication apparatus comprising:
   a card controller configured to control a card connected to the mobile communication apparatus, where the card controller reads out a first information from the card, said first information indicating a characteristic of a mobile network to which said card belongs;
   an interface configured to receive second information broadcast from a mobile network in which said apparatus is located, said second information indicating a characteristic of said mobile network in which said apparatus is located; and
   a memory, said memory storing a table identifying an operation to be performed by the mobile communication apparatus corresponding to the first and second information, wherein said apparatus is configured to set an operation to be performed by the mobile communication apparatus stored in the table based on a comparison of said first and second information, and wherein said table identifies a plurality of home and registered network pairs and one or more different incoming call routing operations for each of said pairs.

2. The apparatus of claim 1, wherein the first and second information comprise a country code.

3. The apparatus of claim 1, wherein the memory comprises a removably connected and customer interchangeable integrated circuit.

4. The apparatus according to claim 1, wherein the first information is a country code of a home network of the mobile communication apparatus, and the table further stores a telephone number to which the operation applies.

5. The apparatus according to claim 1, further comprising a display that displays a roaming message if a country code in said first information does not coincide with a country code in said second information.

6. The apparatus according to claim 5, wherein the display displays caller ID from the mobile network in which said apparatus is located with the roaming message.

7. The apparatus according to claim 1, wherein the first information includes a country code and a network code of a home network of the mobile communication apparatus.

8. The apparatus according to claim 1, wherein the operation is at least one of accepting an incoming call, ignoring an incoming call, forwarding an incoming call to a voice mail service, and recording a voice mail on the mobile communication apparatus.

9. A mobile communication apparatus comprising:
   a card controller configured to control a card connected to the mobile communication apparatus, where the card controller reads out home country code information and home network code information from the card;
   an interface configured to receive registered country code information and registered network code information from a mobile network in which said apparatus is locate; and
   a memory, said memory storing a table identifying a plurality of sets of home country code information, home network code information, registered country code information and registered network code information, and for each set, an identification of an incoming call handling operation to be performed by the mobile communication apparatus in response to an incoming call, and a time period for permitting the operation.

10. The apparatus according to claim 9, wherein the operation is receiving an incoming call.

11. The apparatus according to claim 9, wherein the operation is one of accepting an incoming call, ignoring an incoming call, forwarding an incoming call to a voice mail service, and recording a voice mail on the mobile communication apparatus.

12. A mobile communication apparatus, comprising:
   one or more storage devices; and
   a controller, wherein said controller is configured to:
      determine a roaming status of said mobile communication apparatus by comparing network indication information stored in said one or more storage devices with broadcast network indication information received by said apparatus from a mobile network in which said mobile communication apparatus is located;
      set a future incoming call handling operation of said apparatus based on said controller-determined roaming status and a schedule stored in said one or more storage devices;
      display, on a display of said apparatus, an indication of said roaming status; and
      display, on said display of said apparatus, a message indicating a location to which future incoming calls will be routed based on said roaming status.

13. The apparatus of claim 12, wherein said one or more storage devices includes a removably-inserted and user interchangeable memory card.

14. The apparatus of claim 12, wherein said controller is configured to allow a user of said mobile communication apparatus to set a future incoming call handling operation for international roaming.

15. The apparatus of claim 1, wherein said first information includes home country code identification information and home network code identification information for said apparatus; and said second information includes registered country code identification information and registered network code identification information for a network in which said apparatus is located.

16. The apparatus of claim 15, wherein said table identifies at least one incoming call routing operation based on said home and registered country code identification information alone, without regard to said home and registered network code identification information.

17. The apparatus of claim 1, further comprising a display, and a controller configured to display, on a display, an indication of a roaming status of said apparatus, and a message indicating how future incoming calls will be handled based on said roaming status.

18. The apparatus of claim 17, wherein said message indicates a location to which future incoming calls will be routed.

* * * * *

UNITED STATES PATENT AND TRADEMARK OFFICE
CERTIFICATE OF CORRECTION

PATENT NO. : 7,209,735 B2
APPLICATION NO. : 10/086867
DATED : April 24, 2007
INVENTOR(S) : Hiroaki Sato It is certified that error appears in the above-identified patent and that said Letters Patent is hereby corrected as shown below:

Column 10, Line 5:
    Please delete "on a display" and insert --on said display--

Signed and Sealed this

Twenty-third Day of October, 2007

JON W. DUDAS
*Director of the United States Patent and Trademark Office*